United States Patent [19]

Horn

[11] Patent Number: 4,986,151
[45] Date of Patent: Jan. 22, 1991

[54] TOOL HOLDER FOR A SCREW MACHINE BOX TOOL

[76] Inventor: Daniel T. Horn, 1633 N. Normandy, Chicago, Ill. 60635

[21] Appl. No.: 338,854

[22] Filed: Apr. 17, 1989

[51] Int. Cl.$^5$ ............................................. C23B 16/04
[52] U.S. Cl. ........................................ 82/157; 82/110; 407/102
[58] Field of Search ................ 82/110, 157, 130, 114; 407/102, 103, 104, 117

[56] References Cited

U.S. PATENT DOCUMENTS

| | | | |
|---|---|---|---|
| 994,660 | 6/1911 | Childs | 407/103 |
| 1,085,800 | 2/1914 | Crandall | 82/157 |
| 2,537,274 | 6/1948 | Le May | 407/102 |

Primary Examiner—Frederick R. Schmidt
Assistant Examiner—Lawrence Cruz

[57] ABSTRACT

A tool holder for a small screw machine box tool, having a uniform diameter for easy removal and a carbide insert both useable in either right or left hand box tools.

9 Claims, 4 Drawing Sheets

TOOL HOLDER FOR A SCREW MACHINE BOX TOOL

BACKGROUND OF THE INVENTION

A box tool for automatic screw machines typically consists of a hollow spindle and housing assembly through which work to be turned travels. In some of these box tools, a tool slide is provided that has a clamp for holding a cutting tool in a direction generally transverse to the box tool hollow bore, In others, the box tool is of the roller type that has two or more rollers that engage and support the work as it travels through the tool and a clamp for clamping a tool holder generally somewhat offset from the axis of the work.

For many years, these tools holders were one piece with integral cutting edges at the working end thereof. These tools had a severe limitation on their cutting speeds and required frequent grinding to renew worn cutting surfaces.

Several years ago tool holders were devised for large diameter box tools that had indexible carbide inserts to achieve higher cutting speeds and longer life. However, indexible carbide inserts, have not to the best of our knowledge been utilized in tool holders for small diameter box tools. We attribute this to the fact that the large diameter box tool tool holders have enlarged working ends that require the complete disassembly of the box tool tool holder clamp each time the tool holder is removed for either insert indexing or replacement. Another problem in these large diameter box tool tool holders is that different tool holders are requried for right and left hand operation.

It is a primary object of the present invention to ameliorate the problems noted above in cutting tools for small diameter screw machine box tools.

SUMMARY OF THE PRESENT INVENTION

In accordance with the present invention a tool holder is provided for a small diameter screw machine box tool, having a uniform diameter that enables easy insertion and removal form the box tool and an indexible carbide insert both useable in either right or left hand box tools.

Toward these ends, the present box tool has a square uniform cross section with a transverse working end having an angle of approximately 8-1/2 degrees with respect to the longitudinal axis of the holder. A "V" shaped recess is formed in this working end and releasably receives a small indexible carbide triangular insert having a "neutral" cutting form so it is capable of either right or left hand cutting. The insert has a side dimension of approximately 0.256 inches with a nose radius of 0.012 to 0.016 inches, a thickness of approximately 0.071 inches, and top rake angles of 6 to 20 degrees.

The recess in the tool holder is configured so that two of the three cutting edges on the insert overhang the opposite sides of the tool holder. This enables the same tool holder to be used in either right or left hand box tools without even indexing the insert. Of course, the insert can be indexed after wear of the originally exposed cutting nose.

An important aspect of the present invention is that the tool holder can be readily removed from and reclamped in the tool holder without remvoing the clamp or substantially loosening it.

Other objects and advantages will appear more clearly from the following detailed description.

DETAILED DESCRIPTION OF THE PREFERRED EMBODIMENT

Figure 1:
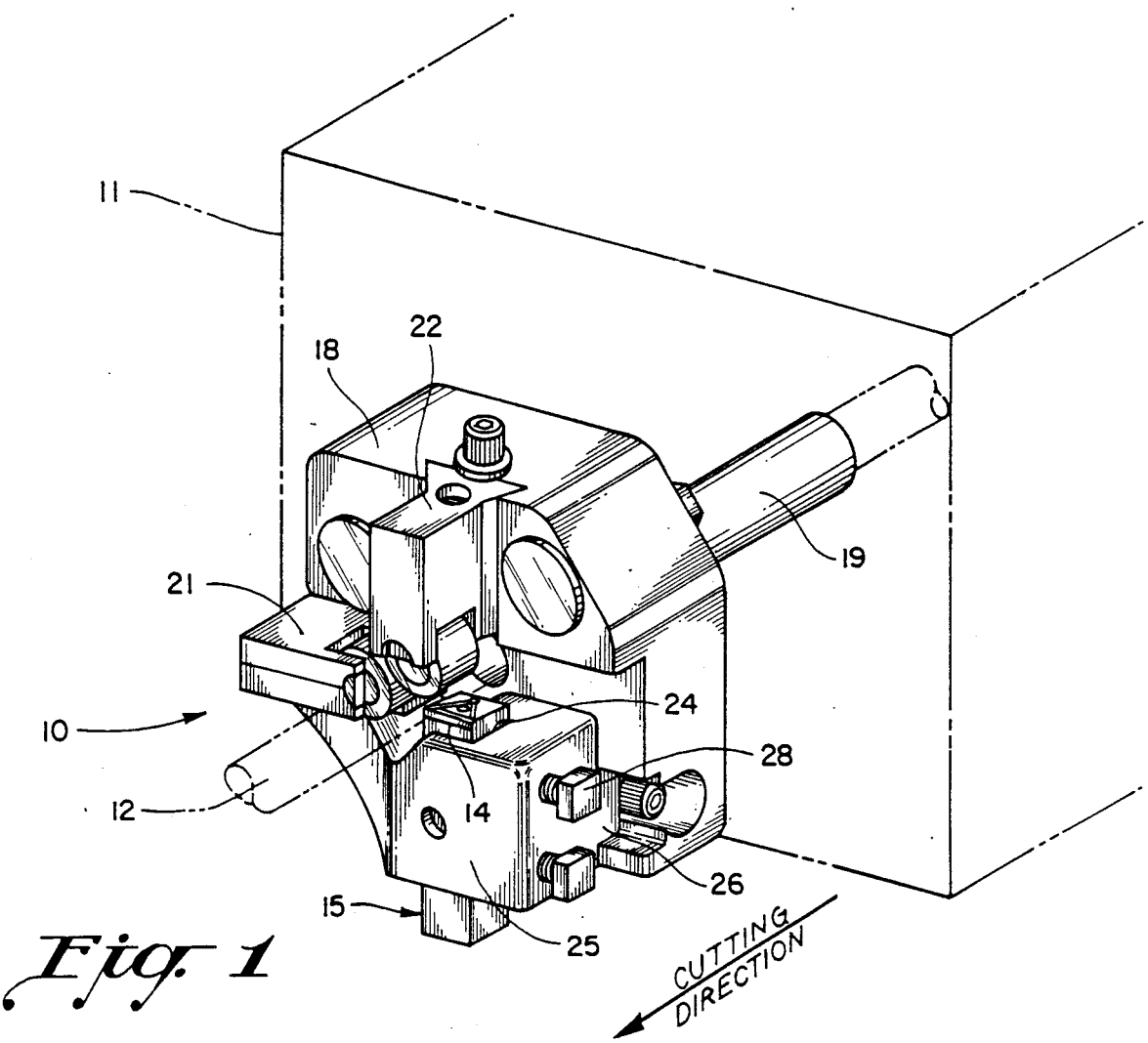
FIG. 1 is a perspective view of a screw machine box tool holder with the present box tool holder in position.
Figure 2:
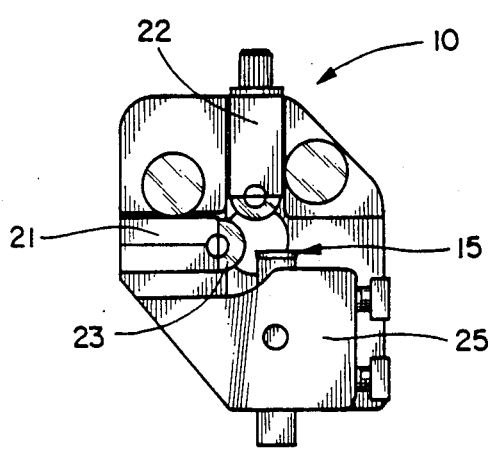
FIG. 2 is a front view of the box tool illustrated in FIG. 1.
Figure 3:
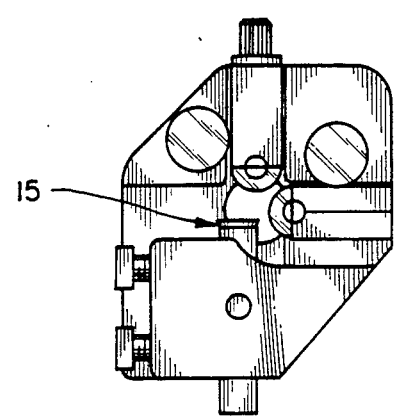
FIG. 3 is a front view of a left hand box tool with the same tool holder illustrated in FIGS. 1 and 2 box tool.

Referring to the drawings and particularly FIGS. 1 to 3, a screw machine box tool 10 is illustrated and is seen to be of the roller type shown in conjunction with a diagrammatically represented screw machine 11 that feeds a rod-like workpiece 12 centrally through the box tool 10 where it is turned by carbide insert 14 in a tool holder 15.

The box tool 10 includes a housing or frame 18 with a rearwardly projecting tube-like spindle 19 through which work piece 12 travels, and orthogonally related slide and roller assemblies 21 and 22 that carry rollers 23 that guide work pieces 12 and maintain its accurate registry with carbide cutting insert 14.

The tool holder 15 is carried in a rectangular bore 24 in clamping block 25 carried by a slide 26 adjustable in housing 18 to provide radial adjustment of cutting insert 14 with respect to the axis of work piece 12. The tool holder 15 and hence cutting tool insert 14 are locked in clamping block 25 by fasteners 28 to permit vertical adjustability for the tool holder 15 and insert 14.

Figure 4:
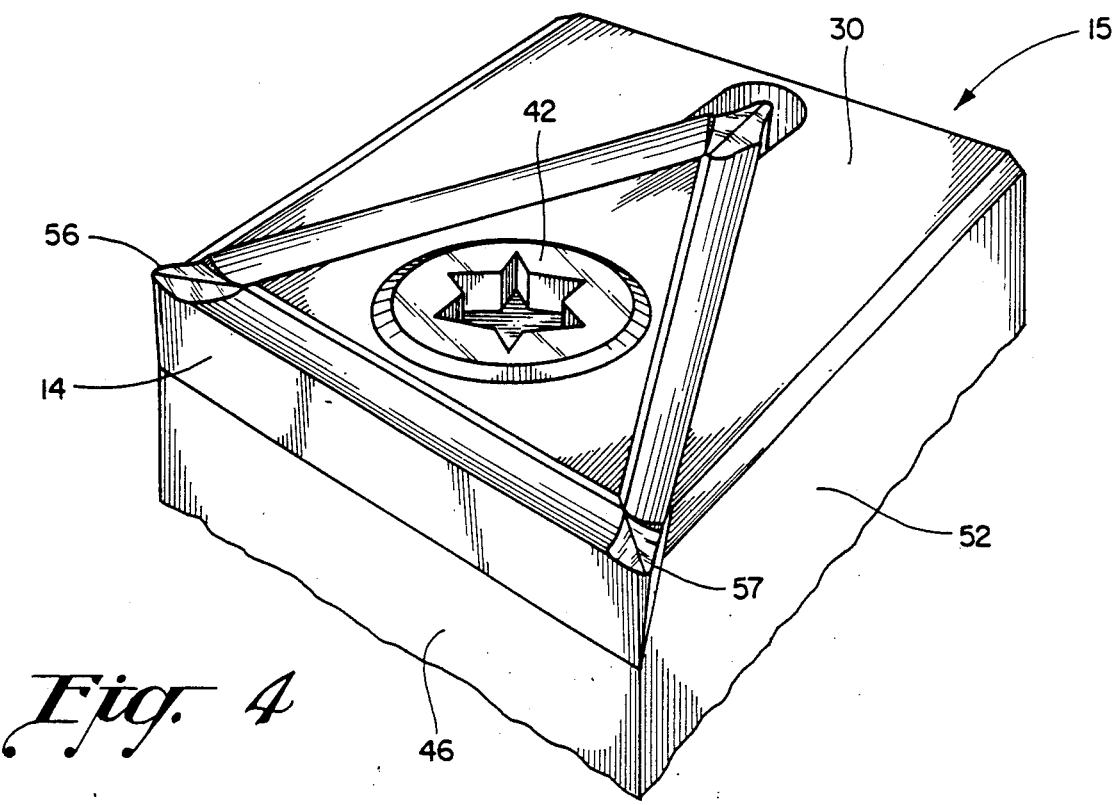
FIG. 4 is an enlarged fragmentary perspective view of the tool holder illustrated in FIGS. 1 to 3.
Figure 5:
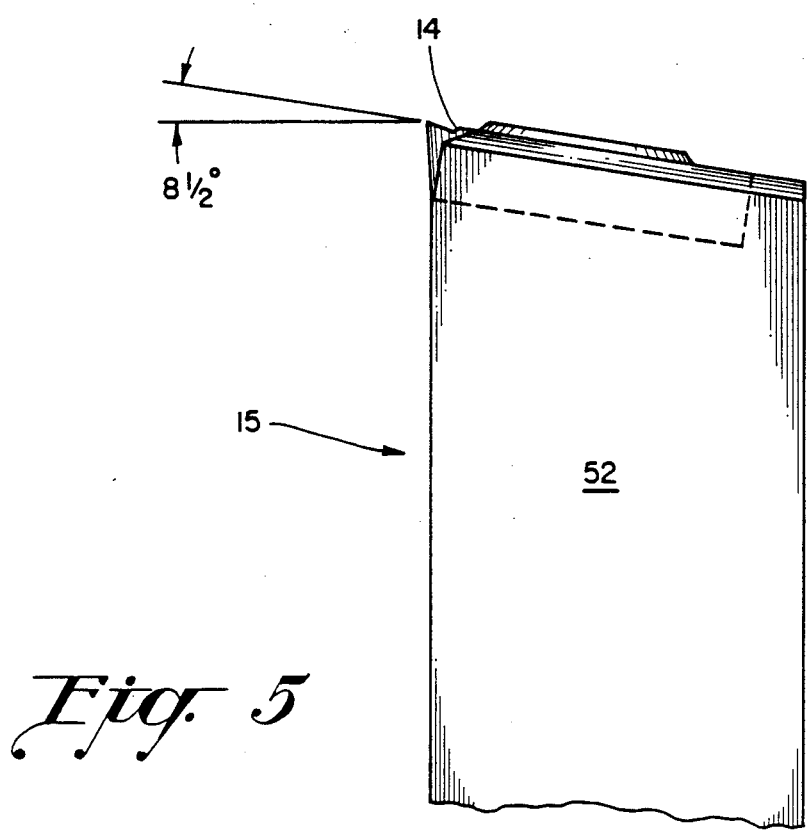
FIG. 5 is an enlarged fragmentary side view of the tool holder according to the present invention.
Figure 6:
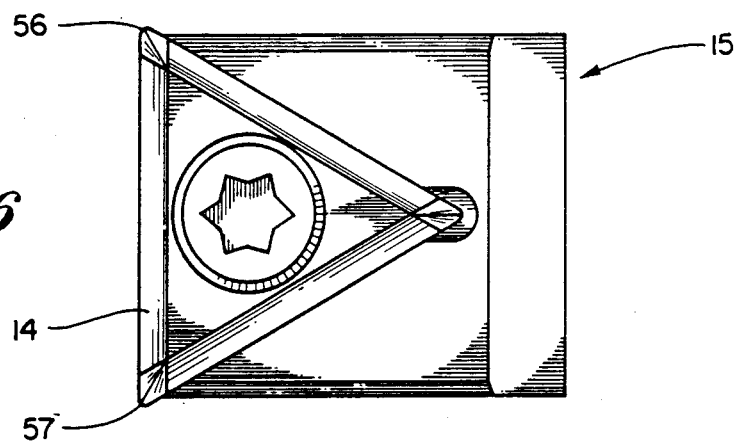
FIG. 6 is a top view of the tool holder according to the present invention.
Figure 7:
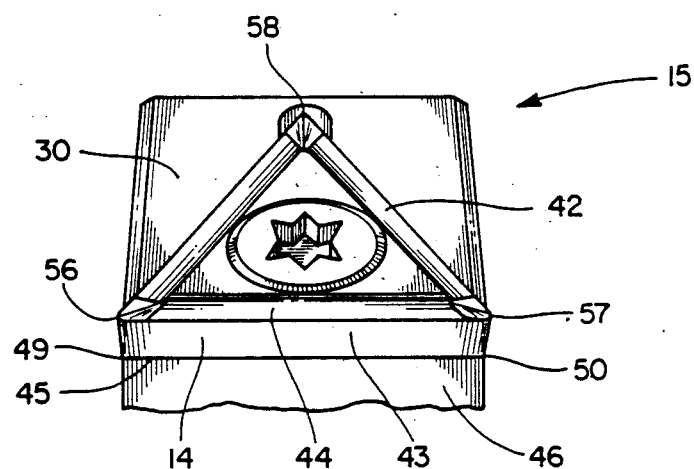
FIG. 7 is a fragmentary front perspective of the tool holder according to the present invention.

As seen more clearly in FIGS. 4, 5 and 6, tool holder 15 is an elongated tool square steel bar 0.250 inches square, 1.250 inches in length with a top face 30 having an angle of 8 1/2 degrees with respect to a plane transverse to the axis of holder 15 to provide the proper cutting angle.

Figure 8:
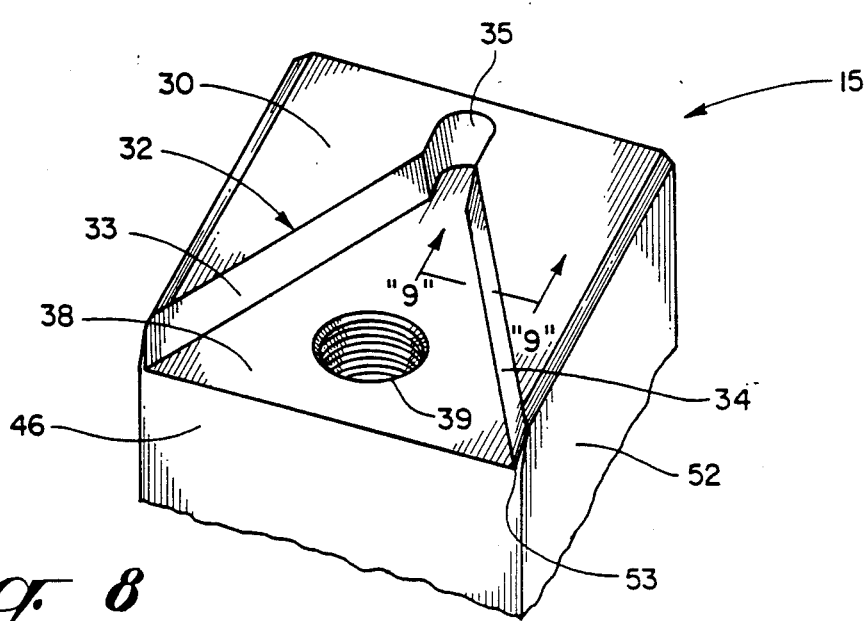
FIG. 8 is a fragmentary perspective of the tool holder according to the present invention with the cutting insert removed.
Figure 9:
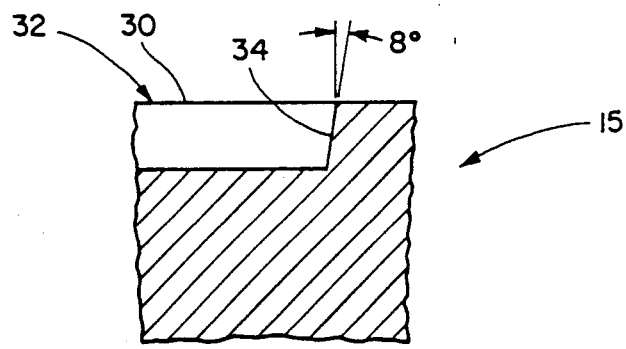
FIG. 9 is a fragmentary section of the tool holder with the insert removed taken generally along line 9—9 of FIG. 8.
Figure 10:
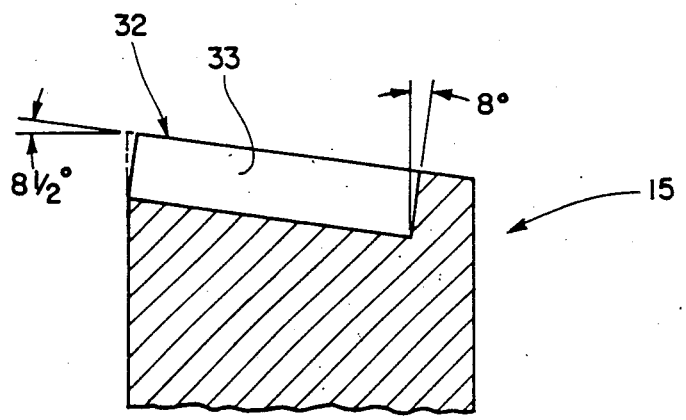
FIG. 10 is a fragmentary longitudinal section of the top of the tool holder according to the present invention with the insert removed.
Figure 11:
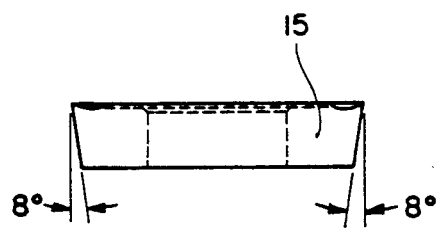
FIG. 11 is a front view of the cutting insert according to the present invention.

The insert 14 is seated in generally V-shaped recess 32 in top face 30 as seen in FIG. 8, and it includes side walls 33 and 34 angled to top face 30 by 8 degrees as seen in FIG. 9 and a slot 35 at their apex for obvious machining clearance. Recess bottom wall 38 has a central threaded aperture 39 therein for receiving a "torx" machine screw 42.

Insert 14 is a triangular carbide insert having three side dimensions of 0.256 inches, an apex height of 0.225 inches and central aperture offset of 0.0785 inches. The insert 14 is a "neutral" insert so that it may be used for either left hand or right hand cutting without changing its position in recess 32. Insert 14 has equiangular side walls 43 all angled at 8 degrees with respect to planes perpendicular to insert top wall 44 so that side walls 43 mate with the recess side walls 33 and 34 to securely lock the insert in the recess.

With this geometry, and with the top of insert 14 substantially coplanar with tool holder top wall 30, and with a 0.071 inches insert thickness, the forward lower edge 45 of insert 14 is coplanar with tool holder front wall 46 and its terminal ends 49 and 50 are slightly inside tool holder side walls 52 at point 53, indicated in FIG. 8 with the insert removed.

This allows insert cutting edges 56 and 57 to protrude outwardly from tool holder side walls 52 and tool holder front wall 46 to achieve the proper cutting action.

With this arrangement tool holder 15 and insert 14 can be used in either right box tool illustrated in FIGS. 1 and 2 or the left hand box tool shown in FIG. 3, and of course, the insert 14 is indexible so that any of the three cutting edges 56, 57 and 58 can be indexed into a cutting position.

I claim:

1. A tool holder for right and left hand small diameter screw machine box tools of the type having a housing with a through bore for work travel on an axis and a tool holder clamp on the housing offset from the through bore with a clamp opening generally transverse to the through bore and the work, comprising: an elongated tool holder having a longitudinal axis adapted to fit in the clamp opening and be clamped to the housing, a polygonal insert recess on a working end of the tool holder lying in a plane generally transverse to the holder axis, and a carbide insert having multiple cutting edges mounted in the recess generally transverse to the longitudinal axis of the tool holder, said insert having at least two adjacent, opposed, and identical cutting surfaces, said recess and insert being constructed and mounting so that the opposed identical cutting surfaces on the insert overhang opposite sides of the tool holder in mirror image fashion whereby the tool holder can be used in both right and left hand box tools without indexing the carbide insert.

2. A tool holder for a small diameter machine box tool as defined in claim 1, wherein the tool holder has a generally transverse end surface at its working end having an angle of approximately 98 degrees with respect to the longitudinal axis of the tool, said insert recess lying in said end surface.

3. A tool holder for a small diameter screw machine box tool as defined in claim 2, wherein said recess is generally on equilateral triangle open at one side to one side of the tool holder to expose two cutting edges of the carbide insert for working engagement with the workpiece.

4. A tool holder for a small diameter screw machine box tool as defined in claim 3, wherein the recess has a pair of intersecting side walls each having an angle of approximately 8 degrees to the longitudinal axis of the tool holder.

5. A tool holder for a small diameter screw machine box tool as defined in claim 1, including means in the recess for locking the insert therein.

6. A tool holder for a small diameter screw machine box tool as defined in claim 1, wherein the carbide insert is a "neutral" insert useable in left or right hand box tools.

7. A small diameter screw machine box tool, comprising; a housing with a through bore for work travel on an axis and a tool holder clamp on the housing offset from the through bore with a clamp opening generally transverse to the through bore and the work, an elongated tool holder having a longitudinal axis, adapted to fit in the clamp opening and be clamped to the housing, a polygonal insert recess on a working end of the tool holder lying on a plane generally transverse to the holder axis, a carbide insert having multiple cutting edges mounted in the recess generally transverse to the longitudinal axis of the tool holder, said insert having at least two adjacent, opposed, and identical cutting surfaces, said recess and insert being constructed and mounted so that the opposed identical cutting surfaces on the insert overhang opposite sides of the tool holder in mirror image fashion whereby the tool holder can be used in both right and left hand box tools without indexing the carbide insert, the tool holder having a generally transverse end surface at its working end having an angle of approximately 98 degrees with respect to the longitudinal axis of the tool, said insert recess lying in said end surface, said recess being generally an equilateral triangle open at one side to one side of the total holder to expose the two cutting surfaces of the carbide insert for working engagement with the work.

8. A tool holder as defined in claim 1, wherein said tool holder has a substantially uniform diameter whereby the tool holder can be easily inserted and removed from the clamp without substantially loosening or removing the clamp.

9. A tool holder for left and right hand small diameter screw machine box tools of the type having a housing with a through bore for work travel on an axis and a tool holder clamp on the housing offset from the through bore with a clamp opening generally tranverse to the through bore and the work, comprising: an elongated tool holder having a longitudinal axis, adapted to fit in the clamp opening and be clamped to the housing, a polygonal insert recess on a working end of the tool holder lying in a plane generally transverse to the holder axis, a carbide insert having multiple cutting edges mounted in the recess generally transverse to the longitudinal axis of the tool holder, said insert having at least two adjacent, opposed, and identical cutting surfaces, said tool holder having a substantially uniform diameter whereby the tool holder can be easily inserted and removed from the clamp without substantially loosening or removing the clamp, said recess and insert being constructed and mounted so that the opposed identical cutting surfaces on the insert overhang opposite sides of the tool holder in mirror image fashion whereby the tool holder can be used in both right and left hand box tools without indexing the carbide insert, the tool holder having a generally transverse end surface at its working end having an angle of approximately 98 degrees with respect to the longitudinal axis of the tool, said insert recess lying in said end surface, said recess being generally an equilateral triangle open at one side to one side of the tool holder to expose two cutting edges of the carbide insert for working engagement with the workpiece.

* * * * *